United States Patent
Bouzid et al.

(10) Patent No.: US 10,129,720 B1
(45) Date of Patent: Nov. 13, 2018

(54) CONVERSATION ASSISTANT

(71) Applicant: GENESYS TELECOMMUNICATIONS LABORATORIES, INC., Daly City, CA (US)

(72) Inventors: Ahmed Tewfik Bouzid, McLean, VA (US); Vadim Snitkovsky, Rockville, MD (US); Michael Ahnemann, Boulder, CO (US); Ashwini Swaroop Reddy Dulam, Lorton, VA (US); Prasanna Sajeewa Naleen Perera, Columbia, MD (US); Brandon Alan Phillips, Hagerstown, MD (US); Paresh Popli, Oak Hill, VA (US); Rajesh Ramchander, Gaithersburg, MD (US); David James Rennyson, Centreville, VA (US); Briam Rodriguez, Miami, FL (US); Michael Jerry Saylor, Tysons Corner, VA (US)

(*) Notice: Subject to any disclaimer, the term of this patent is extended or adjusted under 35 U.S.C. 154(b) by 259 days.

(21) Appl. No.: 13/731,488

(22) Filed: Dec. 31, 2012

Related U.S. Application Data

(60) Provisional application No. 61/582,090, filed on Dec. 30, 2011.

(51) Int. Cl.
*H04L 29/08* (2006.01)
*H04B 1/38* (2015.01)
(Continued)

(52) U.S. Cl.
CPC ..................................... *H04W 4/60* (2018.02)

(58) Field of Classification Search
CPC ......... H04W 4/00–4/003; H04W 4/16; H04W 4/18; H04W 88/00–88/04; H04W 92/00;
(Continued)

(56) References Cited

U.S. PATENT DOCUMENTS 6,587,547 B1 7/2003 Zirngibl et al.
6,658,093 B1 12/2003 Langseth et al.
(Continued)

OTHER PUBLICATIONS

PCT Notification of Transmittal of the International Search Report and the Written Opinion of the International Searching Authority for Application No. PCT/US2013/046723 dated Aug. 26, 2013, 34 pages.

*Primary Examiner* — San Htun

(57) ABSTRACT

A graphical user interface (GUI) on a display of an electronic device visually presents to a user a group of voice bundles that are available for use on the electronic device. Each voice bundle includes a software application for performing a call flow that includes a sequence of prompt instructions and grammar instructions executable to result in a simulated multi-step spoken interaction between the electronic device and the user. An input is received from the user entered through the GUI indicating a selection of a voice bundle from the group of voice bundles. In response to the input, a remote server is identified that stores the selected voice bundle. Network communications is established between the electronic device and the remote server. The selected voice bundle is located on the remote server. A copy of the selected voice bundle is downloaded from the remote server onto the electronic device.

31 Claims, 10 Drawing Sheets

(51) Int. Cl.
  *H04W 4/00* (2018.01)
  *H04M 1/00* (2006.01)
  *H04W 4/60* (2018.01)

(58) Field of Classification Search
  CPC ..... H04W 92/08; H04W 92/10; H04W 4/025;
       H04W 4/29; H04W 4/04; H04W 4/06;
       H04W 4/185; H04W 4/21; H04W
       4/30–4/38
  USPC .......................................................... 455/418
  See application file for complete search history.

(56) References Cited

U.S. PATENT DOCUMENTS

| | | | |
|---|---|---|---|
| 6,707,889 B1 | 3/2004 | Saylor et al. | |
| 6,788,768 B1 | 9/2004 | Saylor et al. | |
| 6,836,537 B1 | 12/2004 | Zirngibl et al. | |
| 6,850,603 B1 | 2/2005 | Eberle et al. | |
| 6,873,693 B1 | 3/2005 | Langseth et al. | |
| 6,885,734 B1 | 4/2005 | Eberle et al. | |
| 6,888,929 B1 | 5/2005 | Saylor et al. | |
| 6,977,992 B2 | 12/2005 | Zirngibl et al. | |
| 7,020,251 B2 | 3/2006 | Zirngibl et al. | |
| 7,266,181 B1 | 9/2007 | Zirngibl et al. | |
| 7,415,537 B1* | 8/2008 | Maes | G06F 17/30905 707/999.01 |
| 7,428,302 B2 | 9/2008 | Zirngibl et al. | |
| 7,457,397 B1* | 11/2008 | Saylor | H04M 3/4938 379/88.17 |
| 7,809,578 B2* | 10/2010 | Vitikainen | G10L 15/30 379/88.01 |
| 8,041,575 B2 | 10/2011 | Agarwal et al. | |
| 8,275,099 B2* | 9/2012 | Agarwal | H04L 12/66 379/67.1 |
| 8,612,230 B2* | 12/2013 | Agapi | H04M 3/4938 704/270 |
| 8,676,895 B1 | 3/2014 | Roy | H04L 65/403 709/205 |
| 8,788,271 B2* | 7/2014 | James | G06F 9/4443 704/270 |
| 2003/0225825 A1* | 12/2003 | Healey | G06F 8/00 709/203 |
| 2004/0117804 A1 | 6/2004 | Scahill et al. | |
| 2005/0288005 A1* | 12/2005 | Roth | H04M 1/271 455/418 |
| 2007/0047719 A1* | 3/2007 | Dhawan | H04M 1/2478 379/235 |
| 2007/0061197 A1 | 3/2007 | Ramer et al. | |
| 2007/0116200 A1* | 5/2007 | Hewitt | G06F 17/30873 379/88.01 |
| 2007/0168215 A1* | 7/2007 | Tang | G06Q 10/109 379/88.04 |
| 2007/0293194 A1* | 12/2007 | Bisht | H04M 1/72533 455/411 |
| 2008/0065390 A1 | 3/2008 | Ativanichayaphong et al. | |
| 2008/0304632 A1* | 12/2008 | Catlin | H04M 3/4938 379/88.04 |
| 2008/0319757 A1* | 12/2008 | Da Palma | G06F 17/30899 704/270.1 |
| 2009/0006100 A1* | 1/2009 | Badger | 704/275 |
| 2009/0138269 A1 | 5/2009 | Agarwal et al. | |
| 2009/0204600 A1 | 8/2009 | Kalik et al. | |
| 2009/0307105 A1* | 12/2009 | Lemay | G06F 8/61 705/26.1 |
| 2010/0057468 A1* | 3/2010 | Lin | G10L 21/00 704/275 |
| 2010/0088100 A1* | 4/2010 | Lindahl | G10L 15/30 704/270.1 |
| 2010/0146443 A1 | 6/2010 | Zuckerberg et al. | |
| 2010/0158218 A1* | 6/2010 | Dhawan | H04M 1/2478 379/88.18 |
| 2010/0166161 A1* | 7/2010 | Dhawan | H04M 1/2478 379/88.19 |
| 2010/0233996 A1* | 9/2010 | Herz | H04L 63/08 455/411 |
| 2010/0312547 A1* | 12/2010 | Van Os | G06F 3/167 704/9 |
| 2011/0010324 A1 | 1/2011 | Bolivar et al. | |
| 2011/0099040 A1* | 4/2011 | Felt | G06F 17/3087 705/7.12 |
| 2011/0283190 A1* | 11/2011 | Poltorak | G10L 13/033 715/716 |
| 2011/0286586 A1 | 11/2011 | Saylor et al. | |
| 2012/0035924 A1* | 2/2012 | Jitkoff | G01C 21/3608 704/235 |
| 2012/0209608 A1* | 8/2012 | Lee | G06F 3/167 704/246 |

* cited by examiner

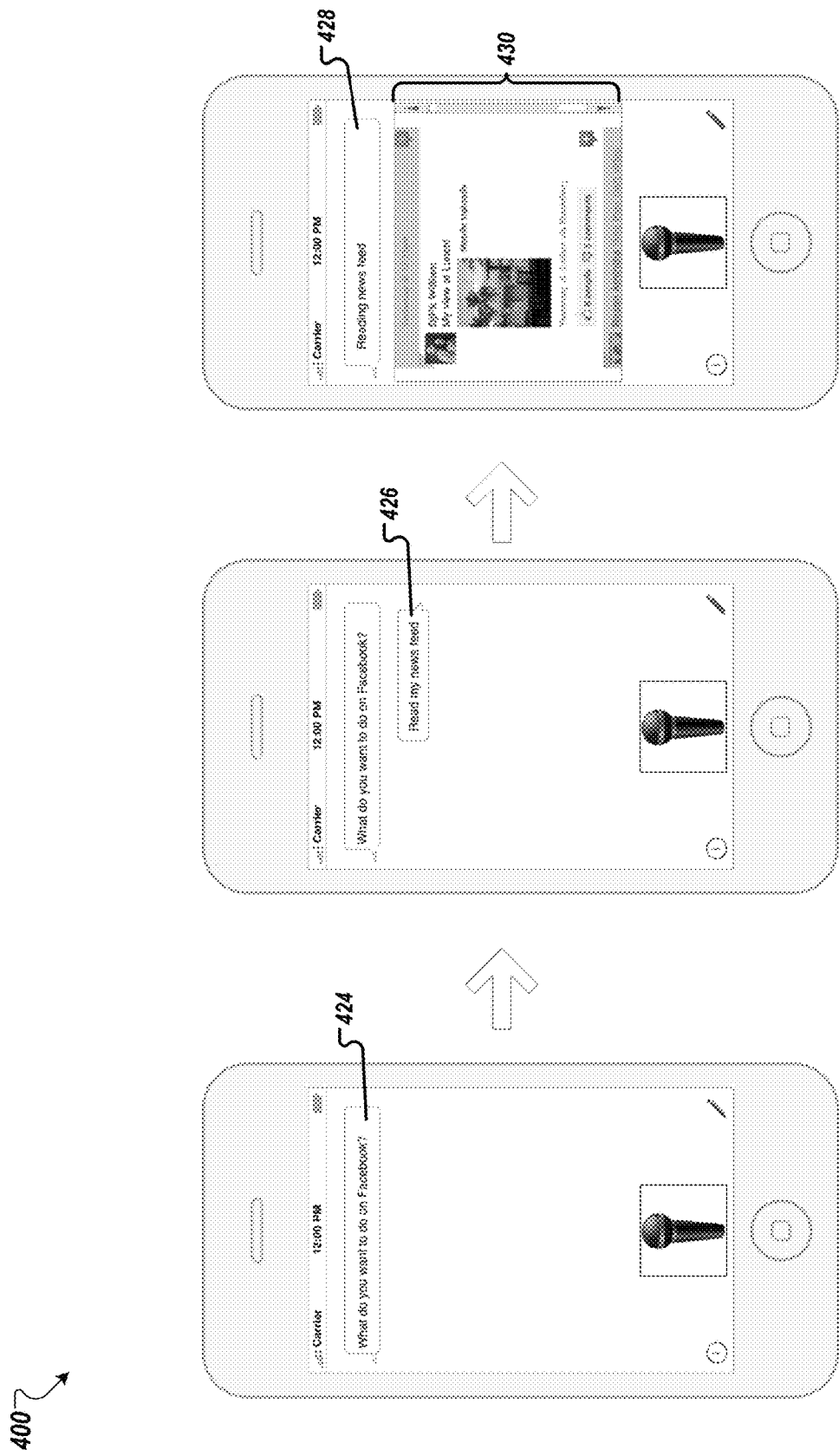

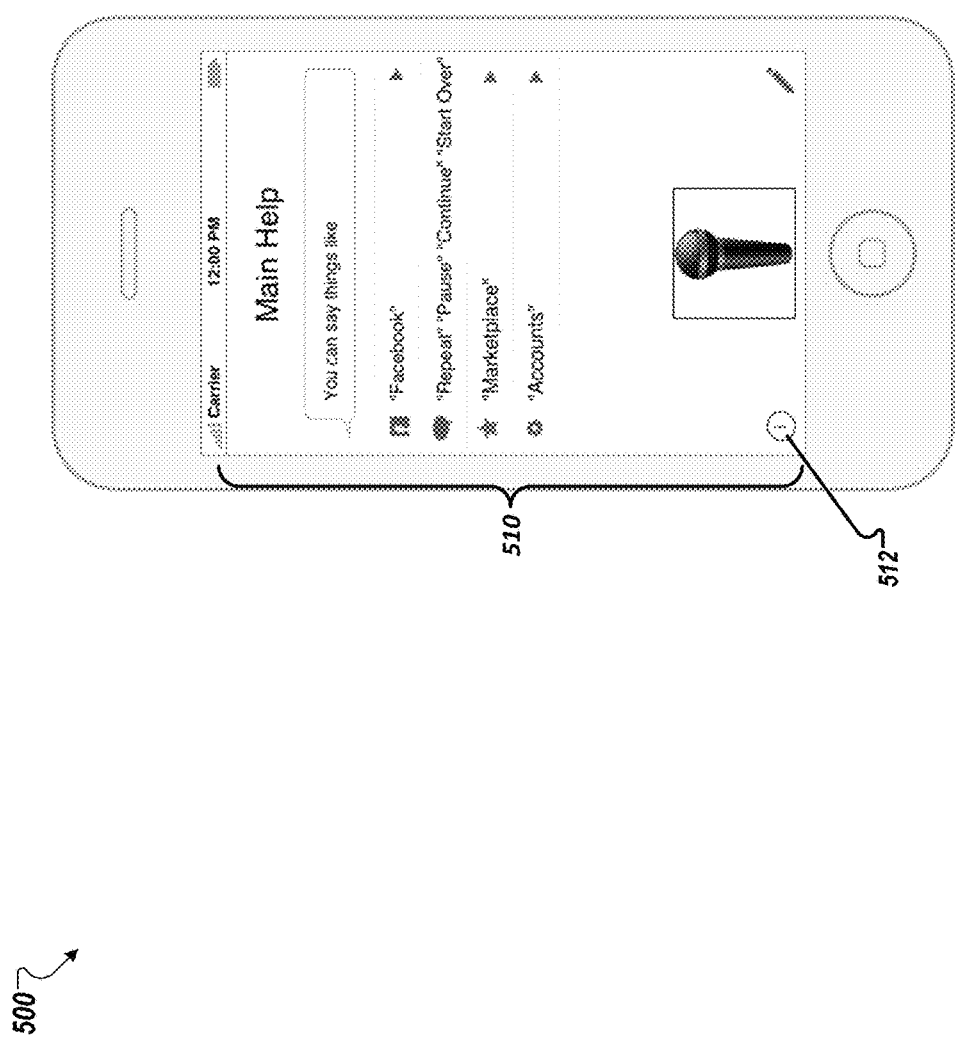

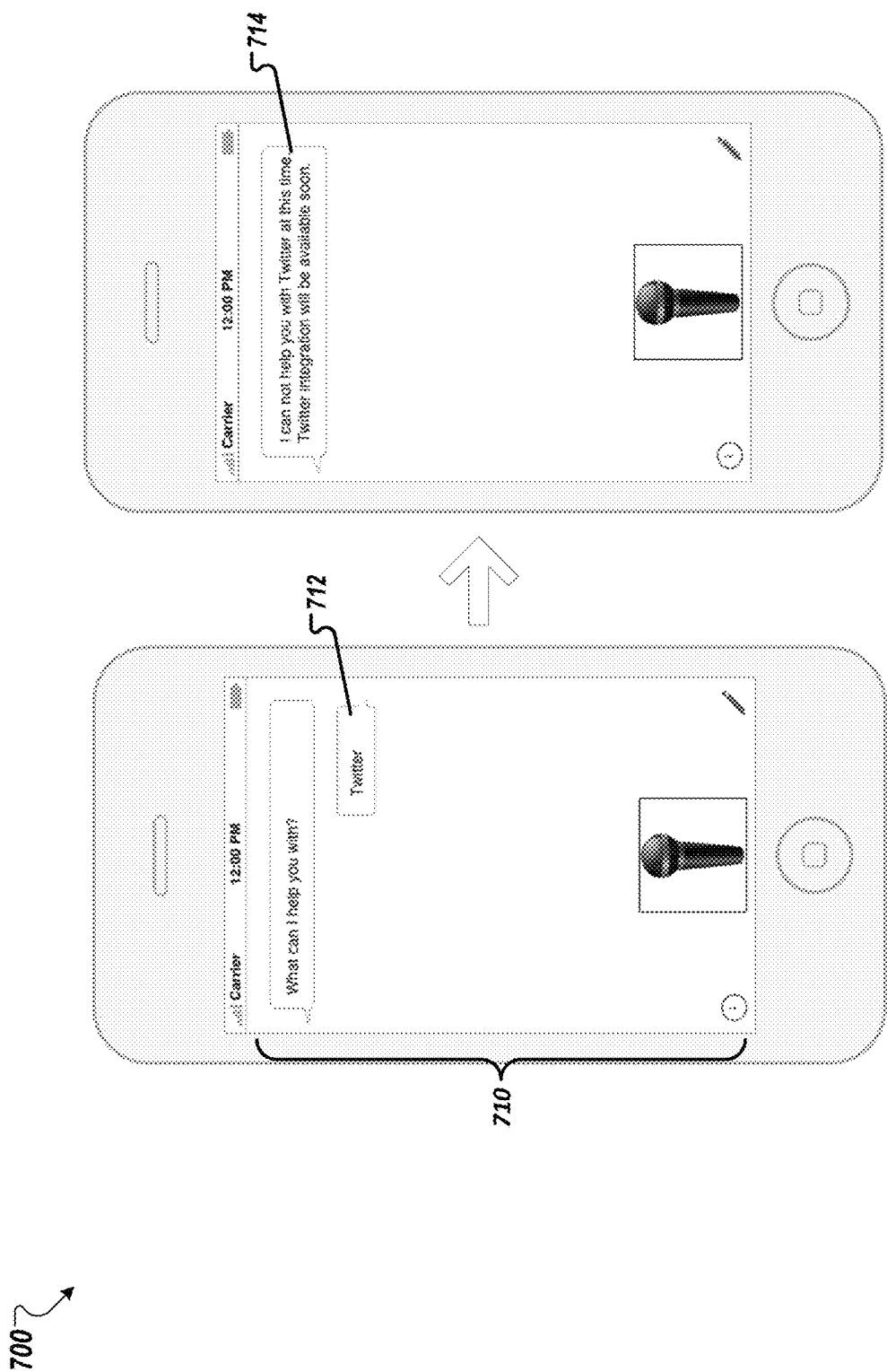

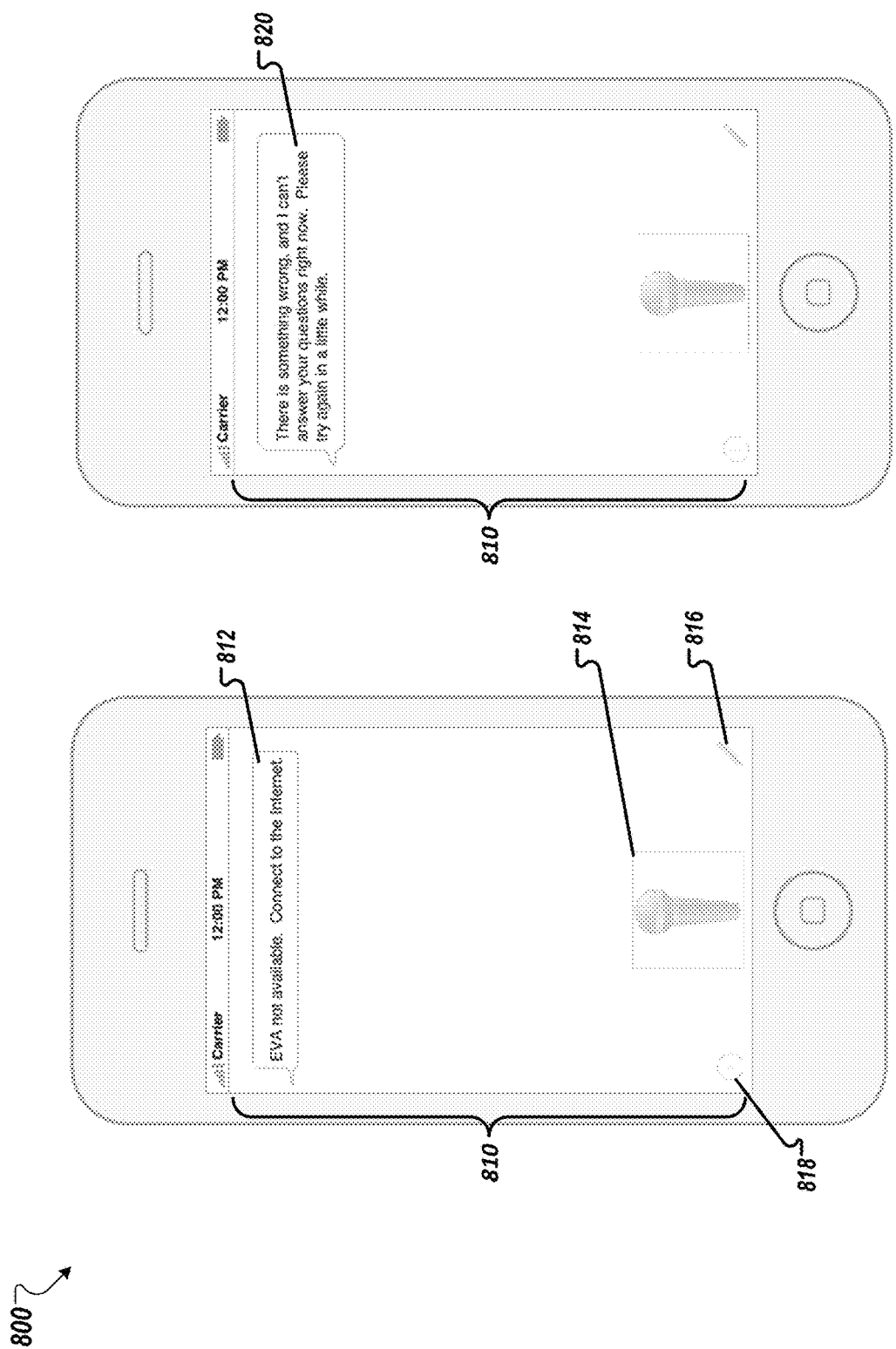

CONVERSATION ASSISTANT

CROSS-REFERENCE TO RELATED APPLICATION

This application claims priority from U.S. Provisional Application No. 61/582,090, filed Dec. 30, 2011, and titled "Conversation Assistant," which is incorporated by reference.

TECHNICAL FIELD

The following disclosure relates generally to interacting with electronic conversation assistants through electronic devices.

BACKGROUND

Users interact with electronic devices, such as smartphones, using software applications. Some applications allow users to interact with the electronic devices by speaking to the smartphone and listening to audible responses from the smart phone.

BRIEF DESCRIPTION OF THE FIGURES

FIGS. 4A-4G are illustrations of an exemplary device displaying a series of screenshots of a GUI of an electronic conversation assistant performing a voice-based interaction.

FIG. 5 illustrates an exemplary device displaying a screenshot of the GUI of an electronic conversation assistant presenting a top level help page.

FIGS. 7A-7B are illustrations of an exemplary device displaying screenshots of a GUI of an electronic conversation assistant for performing an interaction.

FIGS. 8A-8B are illustrations of an exemplary device displaying screenshots of a GUI of an electronic conversation assistant indicating error conditions.

DETAILED DESCRIPTION

Figure 1:
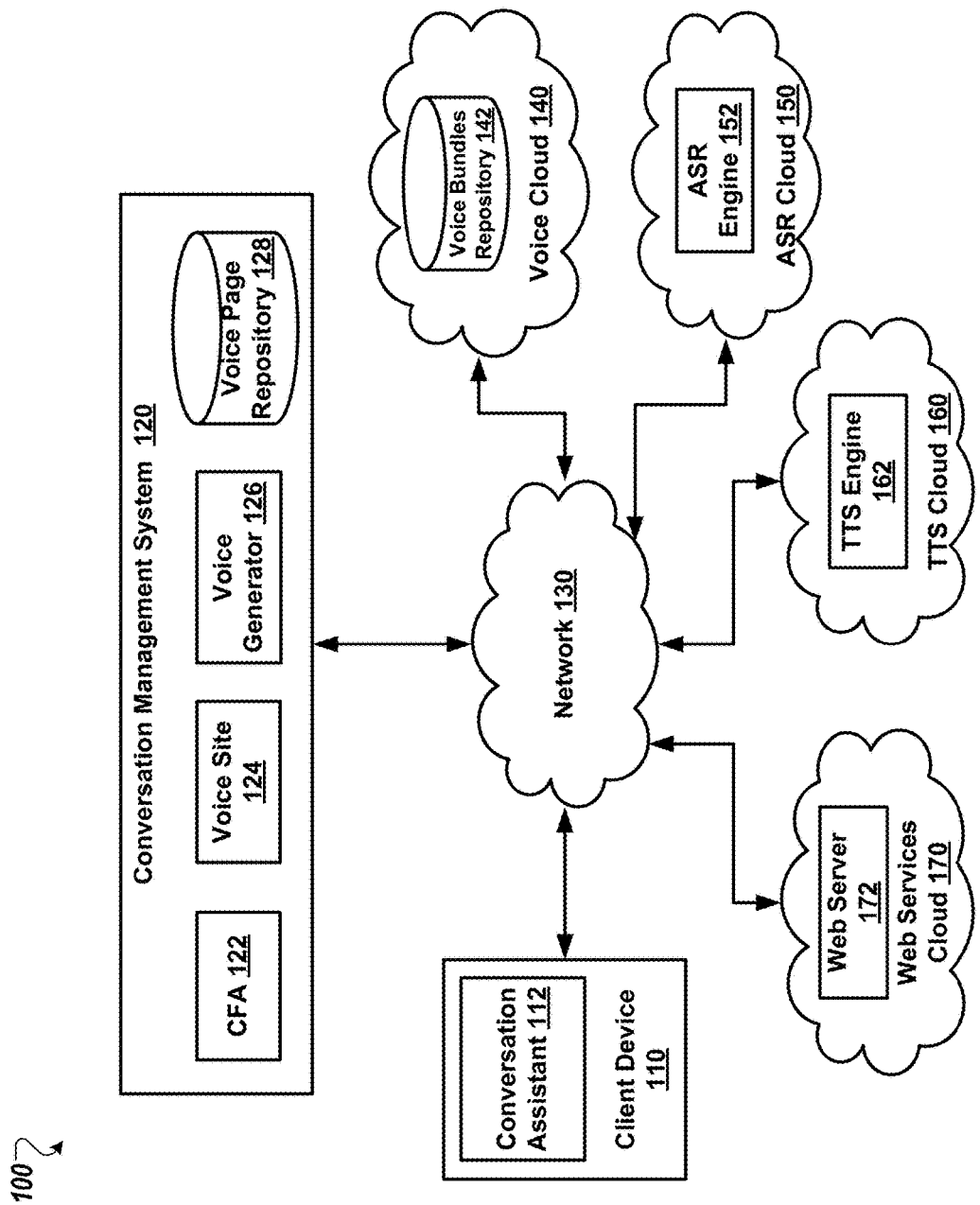
FIG. 1 illustrates a block diagram of an exemplary communications system that facilitates interaction with electronic conversation assistants.

Electronic applications that allow a user to interact with an electronic device in a conversational manner are becoming increasingly popular. For example, software and hardware applications called speech assistants are available for execution on smartphones that allow the user of the smartphone to interact by speaking naturally to the electronic device. Such speech assistants may be hardware or software applications that are embedded in the operating system running on the smartphone. Typically, a speech assistant is configured to perform a limited number of basic tasks that are integrated with the operating system of the smartphone, e.g., launch the default mail or music applications on the smartphone. Outside the context of these basic tasks, the speech assistant may not be able to function.

It may be useful to have electronic assistant applications that are configured to perform a wide variety of tasks, some involving multiple steps, facilitating a more natural interaction of the user with the electronic device. Some of the tasks may allow the user to use popular social networking applications like FACEBOOK™ or TWITTER™ (i.e., interact with popular social networking sites), while other tasks may be more specialized, e.g., troubleshooting a cable box, setting up a video game console, or activating a credit card. The electronic assistant application, also known as the electronic conversation assistant or simply conversation assistant, may provide a conversational environment for the user to interact with the electronic device for using the applications.

The conversation assistant may include a wrapper application provided by a service provider. Other vendors or developers may create packages that can be used with the wrapper application. By being executed within the conversation assistant, the packages may allow interaction with the user using voice, video, text, or any other suitable medium. The service provider may provide the platform, tools, and modules for enabling the developers to create and deploy the specialized packages. For example, a developer builds a voice package using a web-based package building tool hosted by the service provider. The voice package is bundled for consumption on smartphones with the click of a button, and a "voice bundle" is created that consists of a serialized representation of the call flow, the media used in the call flow, and the parameters used to guide the flow and the media being served. The voice bundle is deployed, along with other voice bundles or packages, in online publicly accessible servers (e.g., in the "cloud") and tagged.

A voice bundle may be independent of the type of electronic device, but can be executed by a conversation assistant application provided by the service provider that is running on the electronic device. Different voice bundles may perform different tasks. For example, a social network-specific voice bundle may be configured to read newsfeed, tell the user how many messages or friend requests the user has, reads the messages or friend requests, and confirms the user's friends. Another voice bundle may be configured to allow the user to purchase and send flowers by issuing spoken commands to the electronic device.

A conversation assistant is installed on the electronic device by the user who wants to use one or more voice bundles available in the cloud. With the conversation assistant, the user has access to a market of "voice bundles"— some of which are publicly available for free, some are at a premium, and some are private (the user needs a special key for access to such voice bundles). After the user downloads on the electronic device a voice bundle using the conversation assistant, the user is able to engage in a specialized conversation by executing the voice bundle via the conversation assistant application. The browsing and downloading of the voice bundles, along with the execution of the voice bundles (speaking, listening, doing), are done directly from the conversation assistant.

FIG. 1 illustrates a block diagram of an exemplary communications system 100 that facilitates interaction with electronic conversation assistants. The communications system 100 includes a client device 110 that is connected to a conversation management system (CMS) 120 through a network 130. The client device 110 and the CMS 120 are also connected to a voice cloud 140, an Automatic Speech Recognition (ASR) cloud 150, a Text-to-Speech (TTS) cloud 160 and a web services cloud 170, through the network 130.

The CMS 120 includes a caller first analytics module (CFA) 122, a voice site 124, a voice generator 126 and a voice page repository 128. The voice cloud 140 includes a voice bundles repository 142. The ASR cloud 150 includes an ASR engine 152. The TTS cloud 160 includes a TTS engine 162, and the web services cloud 170 is coupled to a web server 172.

The client device 110 is an electronic device configured with hardware and software that enable the device to interface with a user and run hardware and software applications to perform various processing tasks. The client device 110 is enabled to support voice functionality such as processing user speech and voice commands, and performing text-to-speech conversions. For example, the client device 110 may be a smartphone, a tablet computer, a notebook computer, a laptop computer, an e-book reader, a music player, a desktop computer or any other appropriate portable or stationary computing device. The client device 110 may include one or more processors configured to execute instructions stored by a computer readable medium for performing various client operations, such as input/output, communication, data processing, and the like. For example, the client device 110 may include or communicate with a display and may present information to a user through the display. The display may be implemented as a proximity-sensitive or touch-sensitive display (e.g. a touch screen) such that the user may enter information by touching or hovering a control object (for example, a finger or stylus) over the display.

The client device 110 is configured to establish voice and data communications with other devices and servers across the data network 130 that allow the device 110 to transmit and/or receive multimedia data. One or more applications that can be processed by the client device 110 allow the device 110 to process the multimedia data exchanged via the network 130. The multimedia data exchanged via the network 130 includes voice, audio, video, graphics and textual data.

One of the applications hosted on the client device 110 is a conversation assistant 112. The conversation assistant 112 is an electronic application capable of interacting with a voice solutions platform, e.g., CMS 120, through the network 130. The conversation assistant 112 also interacts with the voice cloud 140, the ASR cloud 150, the TTS cloud 160 and the web services cloud 170 through the network 130. By interacting with the various entities mentioned above, the conversation assistant 112 is configured to perform complex, multi-step tasks involving voice- and/or text-based interaction with the user of the client device 110.

In some implementations, the conversation assistant 112 may be code that is hardcoded in the hardware of the client device (e.g., hardcoded in an Application Specific Integrated Circuit (ASIC)). In other implementations, the conversation assistant 112 may be a conventional software application configured to run on the client device 110 and includes one or more add-ons or plug-ins for enabling different functionalities for providing various services to the user. The add-ons or plug-ins for the conversation assistant 112 are known as "voice bundles". In one implementation, a voice bundle is software application that is configured to perform one or more specific voice and text-based interactions (called "flows") with a user to implement associated tasks. The voice bundle runs on the client device 110 within the environment provided by the conversation assistant 112. As mentioned previously, the voice bundles may be platform-independent and can execute on any client device 110 running the conversation assistant 112. In order to facilitate the interaction with the user, the voice bundle uses resources provided by the ASR cloud 150, the TTS cloud 160 and the web services cloud 170. For example, the voice bundle interacts with the ASR engine 152 in the ASR cloud 150 to interpret speech (e.g., voice commands) spoken by the user while interacting with the conversation assistant 112.

Voice bundles are generated (e.g., by third-party providers) using the voice generator 126, and then made publicly available by being hosted on the voice bundles repository 142 in the voice cloud 140. The conversation assistant 112 and the voice bundles may be downloaded from the voice cloud 140 on the client device 110 by the user of the client device 110.

In one implementation, a voice bundle is a software package that includes code (e.g., State Chart Extensible Markup Language (SCXML) code) describing the flow of the interaction implemented by the voice bundle, media needed for the flow (e.g., audio files and images), grammars needed for interacting with resources provided by the ASR cloud 150, a list of TTS prompts needed for interacting with the TTS engine 162, and configuration parameters needed at application/account level written in Extensible Markup Language (XML). The SCXML may be World Wide Web Consortium (W3C)-compliant XML. A call flow (or flow of interaction) may include, for example, a specification of a particular order to execute grammar and prompt instructions to simulate an interactive spoken conversation with a caller. Grammar instructions are instructions executed to "listen" to the caller. Execution of a grammar instruction results in an analysis of the vocal input provided by the caller to determine its meaning. For example, the audio data captured from the user's speech is analyzed to determine whether the user said "green car" or "blue car." Prompt instructions are instructions executed to "speak" to the caller by audibly communicating words by, for example, playing an audio file (e.g., a .WAV files) or converting a text file into speech using TTS. The call flow may further specify, for example, non-spoken interactions, such as the communication or exchange of text messages and/or images with the caller, at predetermined times during the spoken conversation. For example, after executing the prompt "Please select and send us a picture of the back panel of your computer by following the instructions now displayed on your phone," the call flow may trigger a display of a textual message on the user's client device 110 that provides instructions to the user and triggers a GUI that enables the user to select and communicate a photo to the CMS 120. Upon the CMS 120 receiving the photo, a new prompt instruction may be executed stating "Thank you. Please wait a moment while we analyze the photo." In some implementations, the call flow of the voice bundle includes all or some of the grammar, prompt and other non-spoken interaction instructions, rather than merely specifying the order of their execution.

In one implementation, a voice bundle may be considered as an "expert" application that is configured to perform a specialized task. The conversation assistant 112 may be considered as a "collection of experts," e.g., as an "Expert Voice Assistant" (EVA). The conversation assistant 112 may be configured to launch or use specific experts or voice bundles based on a question or command from the user of the client device 110. The conversation assistant 112 may provide a seamless interaction between two or more voice bundles to perform a combination of tasks.

The CMS 120 is a fully hosted, on-demand voice solutions platform. The CMS 120 may be implemented, for example, as one or more servers working individually or in concert to perform the various described operations. The CMS 120 may be managed, for example, by an enterprise or service provider. Clients of the enterprise can use the resources provided by the CMS 120 to create voice bundles that may be sold or otherwise provided to users, such as the user of the client device 110.

The CFA 122 included in the CMS 120 is an analytics and reporting system that tracks activities of the client device 110 interacting with the voice site 124, or one or more voice bundles through the conversation assistant 112. The CFA may be used, for example, for enhancing the user experience.

The voice site 124 may be one of multiple voice sites hosted by the CMS 120. The voice site 124 is a set of scripts or, more generally, programming language modules corresponding to one or more linked pages that collectively interoperate to produce an automated interactive experience with a user, e.g., user of client device 110. A standard voice site includes scripts or programming language modules corresponding to at least one voice page and limits the interaction with the user to an audio communications mode. A voice page is a programming segment akin to a web page in both its modularity and its interconnection to other pages, but specifically directed to audio interactions through, for example, inclusion of audio prompts in place of displayed text and audio-triggered links to access other pages in place of visual hyperlinks. An enhanced voice site includes scripts or programming language modules corresponding to at least one voice page and at least one multimodal action page linked to the at least one voice page that enables interaction with the user to occur via an audio communications mode and at least one additional communications mode (e.g., a text communications mode, an image communications mode or a video communications mode).

The voice site 124 may be configured to handle voice calls made using the client device 110. The voice site 124 may be an automated interactive voice site that is configured to process, using pre-programmed scripts, information received from the user that is input through the client device 110, and in response provide information to the user that is conveyed to the user through the client device 110. The interaction between the user and the voice site may be done using an interactive voice response system (IVR) provided by a service provider that is hosting the CMS 120. The IVR is configured to support voice commands and voice information using text-to-speech processing and natural language processing by using scripts that are pre-programmed for the voice site, for example, voice-extensible markup language (VoiceXML) scripts. The IVR interacts with the user, by prompting with audible commands, enabling the user to input information by speaking into the client device 110 or by pressing buttons on the client device 110 if the client device 110 supports dual-tone multi-frequency (DTMF) signaling (e.g., a touch-one phone). The information input by the user is conveyed to the IVR over a voice communications session that is established between the client device 110 and the IVR when the call is connected. Upon receiving the information, the IVR processes the information using the pre-programmed scripts. The IVR may be configured to send audible responses back to the user via the client device 110.

In some implementations, the voice site may 124 be an enhanced voice site that is configured to support multimedia information including audio, video, images and text. In such circumstances, the client device 110 and the enhanced voice site can interact using one or more of voice, video, images or text information and commands.

A multimodal IVR (MM-IVR) may be provided by the CMS 120 hosting the voice site 124 to enable the client device 110 and the voice site 124 to communicate using one or more media (e.g., voice, text or images) as needed for comprehensive, easily-understood communications. In this context, "multimodal" refers to the ability to handle communications involving more than one mode, for example, audio communications and video communications.

The voice generator 126 is a server-side module, e.g., software programs, hosted by the CMS 120 that is configured to generate one or more voice bundles based on the content of the voice site 124. The voice bundles that are generated based on the voice site 124 include flows implementing all or part of the interactions configured on the voice site 124. For example, a voice bundle may include flows corresponding to all the VoiceXML scripts associated with the voice site 124. Such a voice bundle also may include the various multimedia resources (e.g., audio files or images) that are accessed by the VoiceXML scripts. In another example, a voice bundle may include flows corresponding to a subset of the scripts associated with the voice site 124, and correspondingly include a subset of the multimedia resources that are accessed by the voice site 124.

The voice page repository 128 is a database storing one or more voice pages that are accessed by voice sites, e.g., voice site 124. In this context, a voice page is a particular type of page that is configured to perform the function of delivering and/or receiving audible content to a user, e.g., user of client device 110.

The network 130 may include a circuit-switched data network, a packet-switched data network, or any other network able to carry data, for example, Internet Protocol (IP)-based or asynchronous transfer mode (ATM)-based networks, including wired or wireless networks. The network 130 may be configured to handle web traffic such as hypertext transfer protocol (HTTP) traffic and hypertext markup language (HTML) traffic. The network 130 may include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The voice cloud 140 includes a collection of repositories of voice bundles such as voice bundles repository 142. The repositories include computer data stores, e.g., databases that are configured to store large amounts of data. In one implementation, the repositories are hosted and/or managed by the same entity, e.g., by the enterprise or service provider managing the CMS 120, while in other implementations, different repositories are hosted and/or managed by different entities. The voice cloud 140 may be accessed from the CMS 120 through the network 130. However, in some cases, there may exist dedicated connections between the CMS 120 and the repositories. For example, the voice generator 126 may be directly connected to voice bundles repository 142 such that management of the voice bundles hosted by the voice bundles repository 142 are facilitated.

The voice bundles repository 142 is accessible by the client device 110 through the network 130. The voice bundles repository 142 may host both public and private voice bundles. A public voice bundle is a voice bundle that is readily accessible by any user, either for free or upon payment of a small fee. For example, a free public voice bundle may be accessed and/or used by a user for free, that is, without paying any fee, requiring any authorization or entering any password. A premium public voice bundle may be accessed and/or used by a user upon payment of a fee, but without requiring any authorization or entering any password.

On the other hand, a private voice bundle is accessible only by those users who have been authorized by the owner/manager of the private voice bundle. For example, when a user attempts to access a private voice bundle, the user is prompted to input a password. If the password is valid, then the user is able to access/invoke the voice bundle. In some implementations, private voice bundles may include both free and premium private voice bundles. For example, a free private voice bundle may be accessible by an authorized user upon entering the valid password. A premium private voice bundle may be accessible by an authorized user upon entering the valid password and the payment of a fee.

The voice bundles hosted by the voice bundles repository 142 also may include free and premium voice bundles. A free voice bundle is a voice bundle that may be used by a user without paying the owner/manager of the voice bundle for the use. On the other hand, the user may have to pay for using a premium voice bundle.

The user of client device 110 may browse the various repositories in the voice cloud 140 by using the conversation assistant 112 on the client device 110. The voice cloud 140 may be independent of the type of the client device 110 or the operating system used by the client device 110. The conversation assistant 112 may present the voice bundles available in the voice cloud 140 using a graphical user interface (GUI) front-end called the "voice bundles marketplace" or simply "voice marketplace". The user may be able to select and download various voice bundles that are available in the voice cloud 140 while browsing the voice marketplace. The downloaded voice bundles are stored locally on the user device 110 such that they are readily accessible by the conversation assistant 112.

The ASR cloud 150 includes a collection of servers that are running software and/or hardware applications for performing automatic speech recognition. One such server is ASR engine 152 (e.g., ISPEECH™, GOOGLE™, and NVOQ™). When executing voice bundles, the conversation assistant 112 may access the ASR engine 152 through the network 130 to interpret the user speech.

The TTS cloud 160 includes a collection of servers that are running software and hardware applications for performing text-to-speech conversions. One such server is TTS engine 162 (e.g., ISPEECH™). When executing voice bundles, the conversation assistant 112 may access the TTS engine 162 through the network 130 to interpret the user speech.

In one implementation, the ASR engine 152 and/or the TTS engine 162 may be configured for natural language processing (NLP). In other implementations, the conversation assistant 112 and/or the voice bundles may be embedded with NLP software (e.g., INFERENCE COMMUNICATIONS™ or SPEAKTOIT™).

In one implementation, the voice bundles may be ASR and TTS-independent, i.e., the specific ASR or TTS engine may not be integrated into the voice bundles. The voice bundles may access the ASR engine 152 or TTS engine 162 when such resources are needed to perform specific tasks. This allows the flexibility to use different ASR or TTS resources without changing the voice bundles. Changes may be localized in the conversation assistant 112. However, in other implementations, the voice bundles and/or the conversation assistant 112 may be embedded with an ASR engine (e.g., NOUVARIS™, COMMAND-SPEECH™), or a TTS engine (e.g., NEOSPEECH™), or both.

The web services cloud 170 couples the client device 110 to web servers hosting various web sites. One such server is web server 172. When executing voice bundles, the conversation assistant 112 may access the web site hosted by web server 172 using the web services cloud 170 to perform actions based on user instructions.

Figure 2:
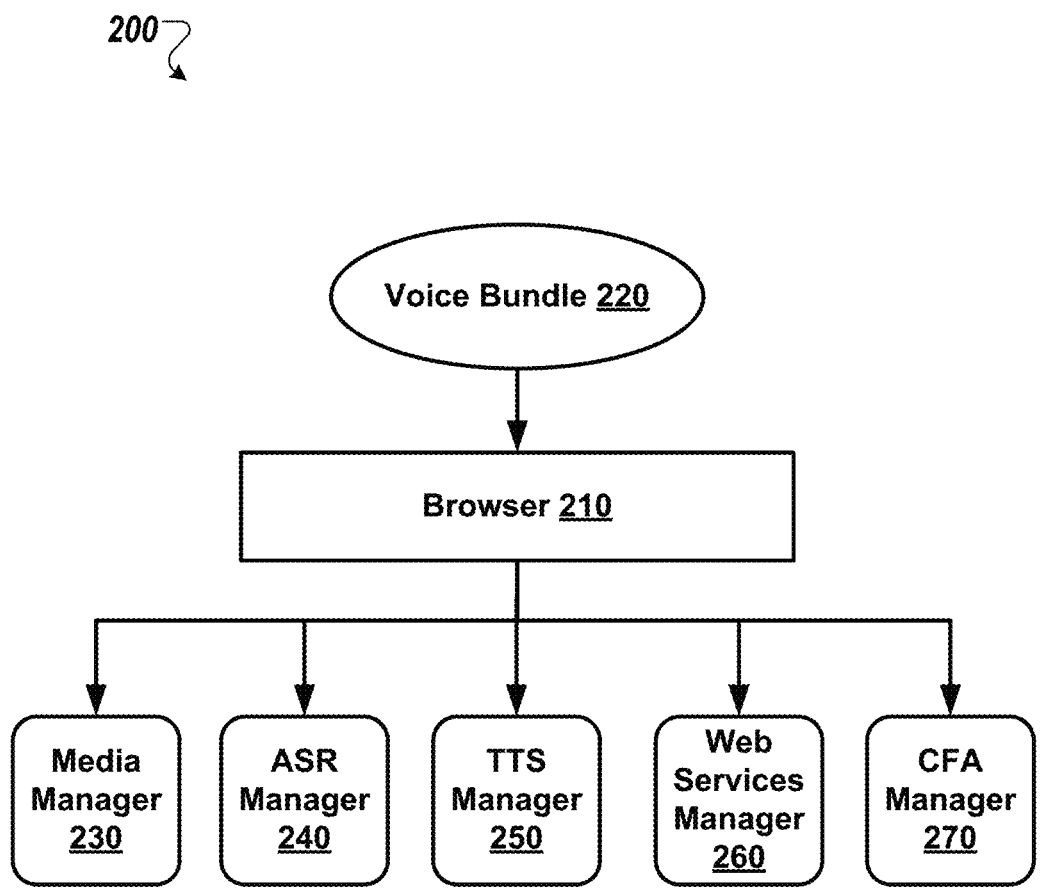
FIG. 2 illustrates an exemplary architecture for an electronic conversation assistant on an electronic device.

FIG. 2 illustrates an exemplary architecture 200 for an electronic conversation assistant on an electronic device. For example, the architecture 200 may be the architecture of the conversation assistant 112 on client device 110. Accordingly, the example below describes the architecture 200 as implemented in the communications system 100. However, the architecture 200 also may correspond to a different conversation assistant, or be implemented in other communications systems or system configurations.

The conversation assistant 112 includes a browser 210 that interfaces a voice bundle 220 with a media manager 230, an ASR manager 240, a TTS manager 250, a web services manager 260 and a CFA manager 270. The browser 210 examines the voice bundle 220 and triggers actions performed by the conversation assistant 112 based on information included in the voice bundle 220. For example, the browser 210 may be a SCXML browser that interprets and executes SCXML content in the voice bundle 220. In order to interpret and execute the content of the voice bundle 220, the browser 210 calls upon the functionality of one or more of the media manager 230, ASR manager 240, TTS manager 250, web services manager 260 and CFA manager 270.

The voice bundle 220 may be a voice bundle that is available on the voice bundles repository 142. The voice bundle 220 may have been downloaded by the client device 110 and locally stored, e.g., in memory coupled to the client device 110, such that the voice bundle is readily available to the conversation assistant 112. However, in some implementations, the conversation assistant 112 may access and process the voice bundle 220 while the voice bundle 220 is in the cloud, that is, hosted by the voice bundles repository 142. While only one voice bundle 220 is shown, the conversation assistant 112 may include multiple voice bundles that are stored on the client device and executed by the conversation assistant 112. The content of each voice bundle is interpreted and executed using the browser 210.

When voice bundles are stored locally on the client device 110, the conversation assistant 112 may download voice bundles as needed, based upon selection by the user from the voice marketplace. The user also may delete, through the conversation assistant 112, voice bundles that are locally stored on the client device 110.

The media manager 230 is a component of the conversation assistant 112 that mediates the playing of sound files and the displaying of images during the execution of a flow. For example, the conversation assistant 112 may perform voice and text-based interaction with the user of the client device 110 based on a flow indicated by voice bundle 220. The flow may include an instruction for playing an audio file included in the voice bundle 220. When the conversation assistant 112 executes the instruction, the browser 210 invokes the media manager 230 for playing the audio file.

The ASR manager 240 is a component of the conversation assistant 112 that mediates the interaction between the browser 210 and a speech recognition resource. The speech recognition resource may be stored in the client device 110 and readily accessible by the conversation assistant 112. For example, the speech recognition resource may be embedded in the conversation assistant 112. Alternatively, the speech recognition resource may be in the ASR cloud 150, e.g., ASR engine 152.

The TTS manager 250 is a component of the conversation assistant 112 that mediates the interaction between the browser 210 and a TTS resource. The TTS resource may be stored in the client device 110 and readily accessible by the conversation assistant 112. For example, the TTS resource may be embedded in the conversation assistant 112. Alternatively, the TTS resource may be located in the TTS cloud 160, e.g., TTS engine 162.

The web services manager 260 is another component of the conversation assistant 112 that mediates the interaction between the browser 210 and external services. For example, the browser 210 may use the web services manager 260 to invoke scripts and services from a remote web site, such as AMAZON™ or PAYPAL™. The web services manager 260 may return SCXML instructions from the remote web site to the conversation assistant 112. The remote web site may be accessed through the web services cloud 170.

The CFA manager 270 is yet another component of the conversation assistant 112 that logs into the CFA reporting system, e.g., CFA 122. The CFA manager 270 may report on the execution of a flow, e.g., error conditions or diagnostic checks, which are written into logs in the CFA 122. The logs may later be examined by the enterprise and/or the developer of the voice bundle 220 to determine performance, identify errors, etc.

Figure 3:
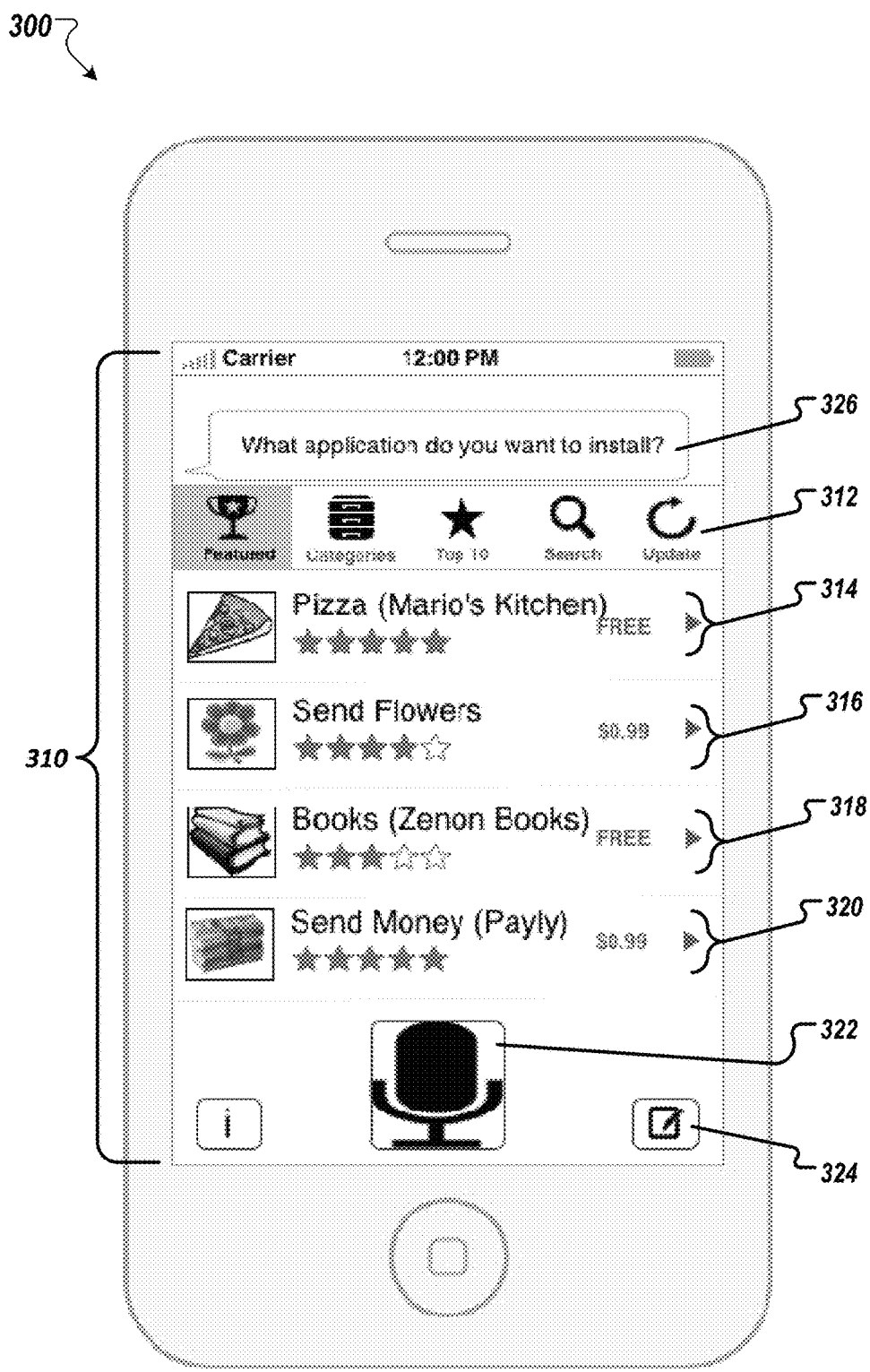
FIG. 3 illustrates an exemplary device displaying a graphical user interface (GUI) for an electronic conversation assistant that enables a user to interact with a voice marketplace to select, purchase, and download voice bundles.

FIG. 3 illustrates an exemplary device 300 displaying a graphical user interface (GUI) 310 for an electronic conversation assistant that enables a user to interact with a voice marketplace to select, purchase, and download voice bundles. The device 300 may be similar to the client device 110 and the GUI 310 may represent the GUI of the conversation assistant 112. Accordingly, the following example describes the device 300 as implemented in the communications system 100. However, the device 300 also may correspond to a device other than device 110, and may be implemented in other communications systems or system configurations.

The conversation assistant 112 displays icons (or, more generally, graphical elements) corresponding to one or more voice bundles 314, 316, 318 and 320 on the GUI 300. Above the voice bundles, a navigation bar 312 is presented for facilitating navigation through the voice marketplace. The conversation assistant displays a microphone button 322 indicating that the current input method is voice mode. A write button 324 is also displayed on the side. The conversation assistant includes a transcription 326 that displays in graphical format a transcription of a current audio query from the conversation assistant 112.

The conversation assistant 112 may present the GUI 310 on the display of device 300 when the user of device 300 provides a command for the conversation assistant to launch the voice marketplace. The user may select one of the options presented on the navigation bar 312 to navigate between different views of the voice marketplace and, thereby, elicit display of different groups of available voice bundles in response. For example, the current display shows the voice bundles that are "featured" voice bundles.

The voice bundles 314, 316, 318 and 320 may be similar to voice bundle 220. The voice bundles 314, 316, 318 and 320 may be available in the voice cloud 140, e.g., stored in voice bundles repository 142. Each voice bundle includes instructions, e.g., SCXML scripts, and multimedia data, e.g., audio files and images, which together enable the voice bundle to perform some specific tasks. For example, voice bundle 314, when executed by the conversation assistant 112, may enable the conversation assistant 112 to interact with the user through voice commands and/or textual input such that the user is able to order a pizza from "Mario's Kitchen." The conversation assistant 112 will use the functionalities provided by the browser 210 to interpret the instructions included in voice bundle 314. Based on the instructions, the conversation assistant 112 may invoke one or more of the media manager 230, ASR manager 240, TTS manager 250, web services manager 260 and CFA manager to perform the task of ordering pizza from Mario's Kitchen. The invoked manager(s) may access the resources provided by the ASR cloud 150, TTS cloud 160, web services cloud 170 or CFA 122 to execute the respective functionality.

As mentioned previously, some of the voice bundles may be free. For example, voice bundles 314 and 318 are free voice bundles, which can be determined by examining the displayed information associated with the voice bundles. However, some other voice bundles may be premium voice bundles, e.g., voice bundles 316 and 318, which can be determined by the displayed price associated with the respective voice bundles. In order to download and install the premium voice bundles, the user may have to make a payment through the voice marketplace. For example, the user may have to pay $0.99 to install either voice bundle 316 or voice bundle 320.

The conversation assistant 112 asks the user to select a voice bundle to install, as shown by the transcription 326. Alternatively, or in addition, the conversation assistant 112 may say aloud the query "What application do you want to install?" The specific query made by the conversation assistant 112 may be based on the hardware or software code implementing the conversation assistant 112 and/or configuration of the conversation assistant 112. The speech may be heard by the user through the speaker(s) of the device 300.

The user may indicate a selection of a voice bundle by speaking into the microphone of the device 300. Alternatively, the user may select a voice bundle by selecting a section of the display proximate to the icon of the voice bundle of choice using a suitable control object (e.g., by touching the display at a location at which the graphical element representing the voice bundle of choice is displayed). Based on the selection by the user, the particular voice bundle is retrieved from the voice cloud 140 by the voice assistant 112 and installed on the device 300. Subsequently, the user may launch the voice bundle using the voice assistant 112 and use the voice bundle.

The conversation assistant 112, when launched, may display on its GUI all the voice bundles that are currently installed on the device 300 and available for immediate use (for example, by displaying icons corresponding to the installed voice bundles). The user may select one of the installed voice bundles (for example, by selecting the icon or other graphical element corresponding to the installed voice bundle) and execute the voice bundle using the conversation assistant 112. Alternatively, the user may ask the conversation assistant 112 to launch the GUI 310 and visit the voice marketplace to download and a voice bundle that is not presently locally available on the device 300.

In some implementations, the conversation assistant is 112 fully enabled to launch one or more voice bundles based on voice commands provided by the user. The conversation assistant 112 may be configured to disambiguate the user command and identify the topic associated with the user command. Based on identifying the topic, the conversation assistant 112 may invoke by itself a voice bundle configured for ordering pizza, without requiring further input from the user. For example, upon launching the conversation assistant 112, the user may simply say a command, such as 'Order a pizza', without invoking any specific voice bundle that is configured to perform the tasks associated with ordering pizza. The conversation assistant processes the user command and recognizes the words "order" and "pizza". These words may trigger the conversation assistant to automatically launch a voice bundle for ordering pizza, e.g., voice bundle 314.

In some implementations, a voice bundle may be executed by the conversation assistant 112 without downloading and installing the voice bundle on the device 300. The user may select a voice bundle by visiting the voice marketplace using GUI 300. Based on the user selection, the conversation assistant 112 may interact with the voice cloud 140 to execute the selected voice bundle remotely, e.g., in the voice cloud 140.

FIGS. 4A-4G are illustrations of an exemplary device 400 displaying a series of screenshots of a GUI 410 of an electronic conversation assistant performing a voice-based interaction. The device 400 may be similar to the client device 110 such that the GUI 410 may represent the GUI of the conversation assistant 112. The example below describes the device 400 as implemented in the communications system 100. However, the device 400 also may correspond to a different device, and may be implemented in other communications systems or system configurations.

In one implementation, the conversation assistant 112 may have two modes of communication with the user of device 400—"talk" mode and "write" mode. In talk mode, the microphone button 412 is emphasized in the bottom center of the GUI 410 and the write button 414 is displayed in one corner. The user may switch from the talk mode to the write mode by selecting the write button 414, e.g., by touching a section of the display proximate to the write button 414 using a control object.

The microphone button 412 is used by the user to talk to the conversation assistant 112. The conversation assistant 112 may use text-to-speech to 'speak' to the user. In addition, the conversation assistant 112 may transcribe the words that it speaks to the user, as shown by the transcription 416.

In one implementation, if the user clicks on the 'microphone' button while conversation assistant 112 is not already "listening", i.e., it is not in talk mode, conversation assistant 112 will switch to talk mode and, upon completing the switch, will play a distinct sound prompt to indicate that conversation assistant 112 is ready to accept speech input from the user. If the user clicks on the 'microphone' button while conversation assistant 112 is in talk mode, the 'microphone' button shall have a distinct animation to indicate that conversation assistant 112 is listening and ready for the user to talk.

The conversation assistant 112 commences processing what the user said after a finite pause having a predetermined duration (for example, 2 seconds), or if the user clicks on the 'microphone' button again. When conversation assistant 112 starts to process what the user said, conversation assistant 112 may play a different but distinct sound prompt indicating that the conversation assistant 112 is processing the user's spoken words. In addition, or as an alternative, the 'microphone' button may show a distinct animation to indicate that conversation assistant 112 is processing what the user said. In one implementation, when the conversation assistant 112 starts to process what the user said, the user may stop the processing by clicking on the 'microphone' button one more time.

In one implementation, after conversation assistant 112 starts to listen, if the user does not say anything for a pre-determined period of time (that is, there is no input from the user during the predetermined period of time, e.g., 6 seconds), conversation assistant 112 may play a distinct sound prompt to indicate that the conversation assistant 112 is going to stop listening, that is, go into idle mode. Subsequently, conversation assistant 112 may go into idle mode and stop listening.

In some implementations, once the conversation assistant 112 successfully processes the user speech, the words spoken by the user are transcribed and displayed on the GUI 410, e.g., using the transcription 418. The user may be able to select the transcribed speech, edit the words using a keyboard 420 displayed on the GUI 410, and resubmit the speech. In one implementation, only the most recent transcribed speech by the user may be editable.

Figures 4A, 4B, 4C:
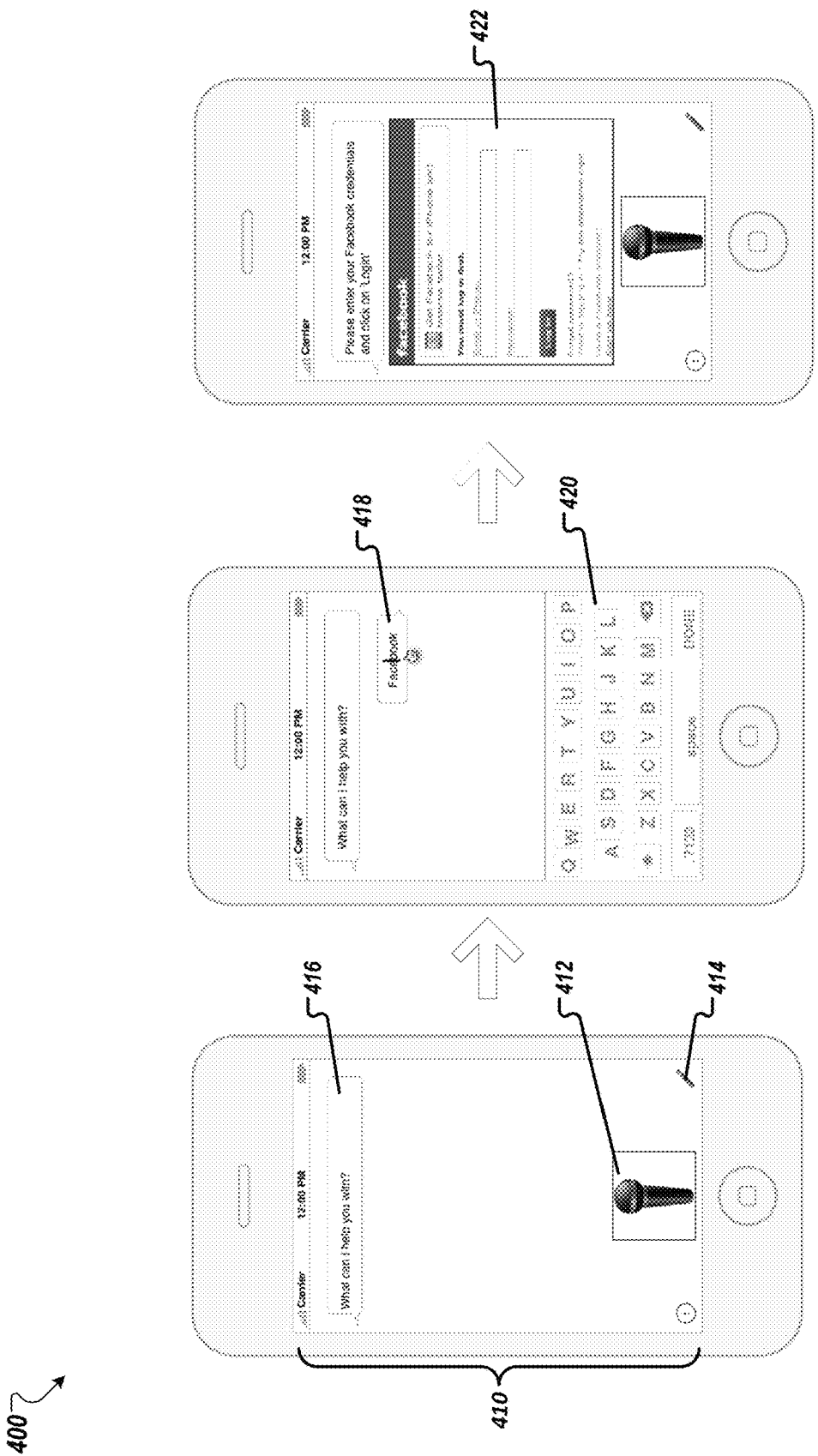

Referring to the flow of interaction between the user and the conversation assistant 112 that is illustrated by the series of screenshots in FIGS. 4A-4G, when the user launches the conversation assistant 112 on the device 400, the home screen of the conversation assistant 112 may be displayed and the conversation assistant 112 says to the user, 'What can I help you with?', as shown in FIG. 4A. In one implementation, the user may say 'Facebook.' Once the conversation assistant 112 has successfully processed the user speech, the transcribed speech is displayed in transcription 418, as shown in FIG. 4B. Notably, in the implementations shown in FIGS. 4B-4F, the transcribed speech of the conversation assistant 112 is distinguished from the transcribed speech of the user through use of different respective conversation clouds, with the user's transcribed speech being displayed in conversation clouds that always point to one edge (e.g., the right edge) of the GUI 410 and the conversation assistant's transcribed speech being displayed in conversation clouds that always point to a different edge (e.g., the left edge) of the GUI 410.

After the user says "Facebook," the conversation assistant 112 executes a voice bundle that is associated with FACEBOOK™. The voice bundle may be locally stored on the device 400. Alternatively, the conversation assistant may determine that no voice bundle associated with FACEBOOK™ is locally stored. In such cases, the conversation assistant 112 may access the voice cloud 140, identify a voice bundle associated with FACEBOOK™ in a voice bundle repository, such as 142, download the identified voice bundle on the device 400 and invoke/execute the voice bundle once downloaded.

Upon executing a voice bundle associated with FACEBOOK™, the conversation assistant 112 may determine that it does not know the credentials of the user for accessing the user's account in FACEBOOK™. This may be the case, for example, when the user is accessing the user's FACEBOOK™ account using conversation assistant 112 for the first time such that the credentials of the user have not been locally cached by the conversation assistant 112 based on a prior use by the user. In such an event, the conversation assistant 112 may ask the user to enter the user's account information and present a log in screen 422, as shown in FIG. 4C. In some implementations, after the user enters his credentials and successfully logs in to the user's FACEBOOK™ account, the conversation assistant 112 may cache the user's credentials for future re-use, for example, when the user accesses FACEBOOK™ again using the conversation assistant 112. For subsequent accesses, the conversation assistant 112 may directly log in to the user's FACE- BOOK™ account using the cached credentials and without prompting the user to enter the credentials.

After the user successfully logs in to the user's FACEBOOK™ account, the conversation assistant 112 returns to the home screen and prompts the user for further input regarding an action to perform in the user's FACEBOOK™ account. For example, conversation assistant 112 may say, 'What do you want to do on Facebook?', as shown by the transcription 424 of the conversation assistant 112's speech in FIG. 4D.

In one implementation, the user may instruct the conversation assistant 112 to read the user's FACEBOOK™ news feed, as shown by the transcription 426 of the user's voice command in FIG. 4E. The words "news" and "feed" may be trigger words. In this context, a trigger word is a word that is pre-configured on the conversation assistant 112 such that, upon processing a trigger word, the conversation assistant 112 may perform a specific action linked to the trigger word. For example, upon processing the trigger words "news feed," the conversation assistant 112 may say, 'Reading news feed', as shown by transcription 428 in FIG. 4F.

As shown in FIG. 4F, the conversation assistant 112 may then display the user's news feed on the GUI 410 as a vertical scrollable list 430. In addition, in some implementations, the conversation assistant 112 may read the news feed items using a pre-determined format, such as "<name><time><location><message (text/photo/video/link)><#comments><# likes>." For example, the conversation assistant 112 may read: 'John Smith, 1hr ago, from Columbia Ice Rink. Looking forward to the week-end. 5 comments. 10 likes.' If there is a link in a news feed item, conversation assistant 112 may say 'link'. If there is a link to an audio file, conversation assistant 112 may play the audio file, e.g., using the media manager 230. If there is a photo in a news feed item, conversation assistant 112 may say 'photo', or if there is a video, conversation assistant 112 may say 'video'. As the conversation assistant 112 reads a feed item, the corresponding feed item may be highlighted in the displayed list. Conversation assistant 112 may pause for a pre-determined time between reading successive news feed items.

Figure 4G:
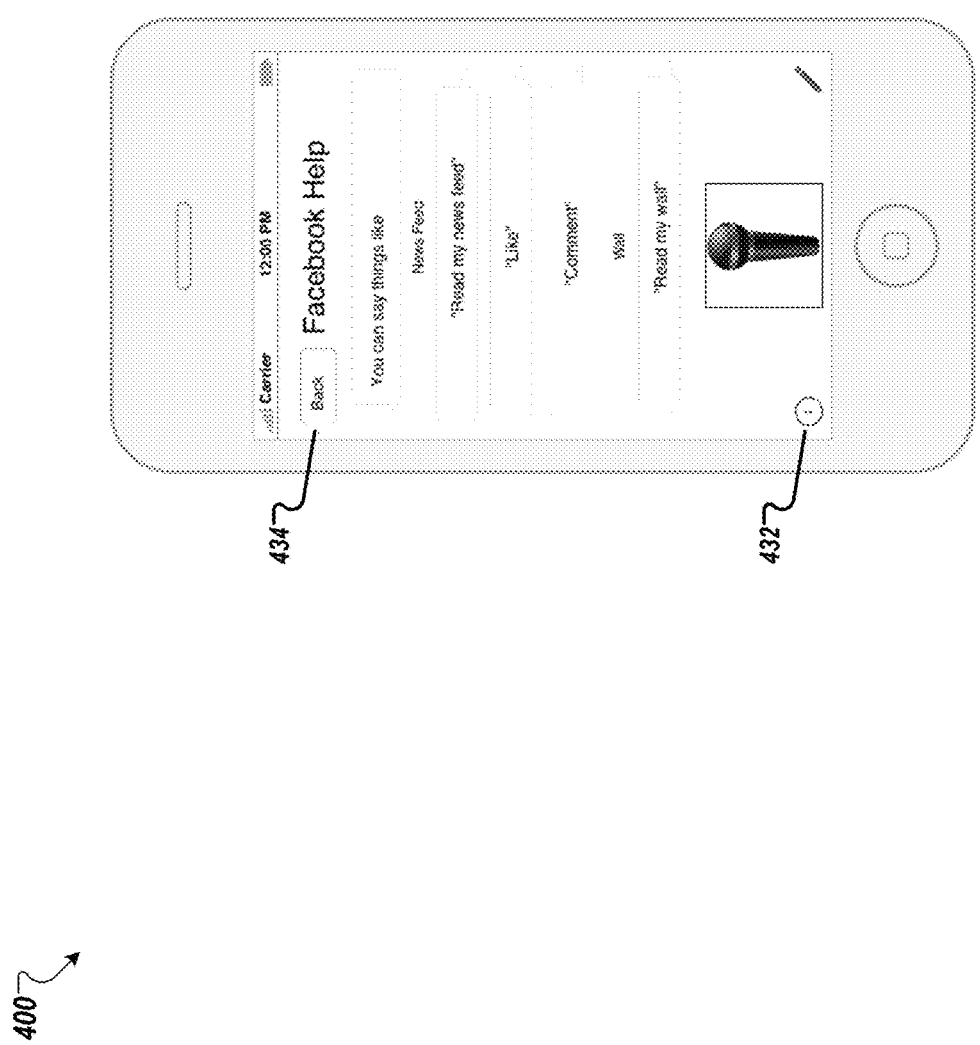

FIG. 4G shows the GUI 410 of the conversation assistant 112 displaying a FACEBOOK™ help page. The conversation assistant 112 may present the FACEBOOK™ help page if the user says 'Help' and/or selects the information button 432 when the conversation assistant 112 is in FACEBOOK™ context, i.e., the conversation assistant 112 is executing the voice bundle performing FACEBOOK™-related tasks. In one implementation, clicking on the back button 434 on the FACEBOOK™ help page will take the user to a top level help page.

FIG. 5 illustrates an exemplary device 500 displaying a screenshot of the GUI 510 of an electronic conversation assistant presenting the top level help page. The device 500 may be same as the client device 110 such that the GUI 510 may represent the GUI of the conversation assistant 112. The example below describes the device 500 as implemented in the communications system 100. However, the device 500 also may correspond to some device other than the device 110, or be implemented in other communications systems or system configurations.

The top level help page includes commands that the user of device 500 may say at the top level of the application. For example, to execute the Facebook voice bundle, the user may say 'Facebook'. To access the voice marketplace, the user may say 'Marketplace'. The conversation assistant 112 will then display the GUI 310 presenting the voice marketplace.

The user may access the top level help by saying 'Help' while the home screen of the conversation assistant 112 is displayed, or by selecting the information button 512 displayed on the GUI 510. If the conversation assistant 112 is in a different context, i.e., the conversation assistant 112 is executing a voice bundle, the user may access the top level help by saying 'main help'.

Figure 6A:
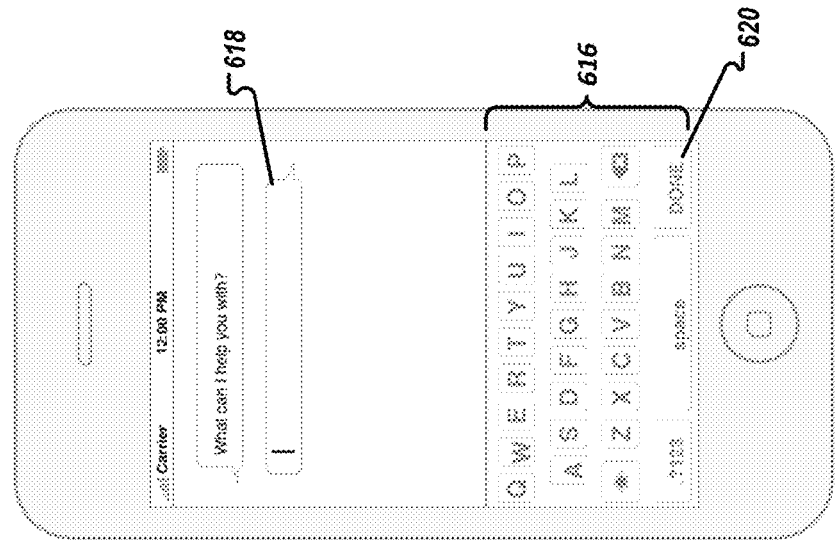
FIGS. 6A-6B are illustrations of an exemplary device displaying screenshots of a GUI of an electronic conversation assistant for performing a text-based interaction.
Figure 6B:
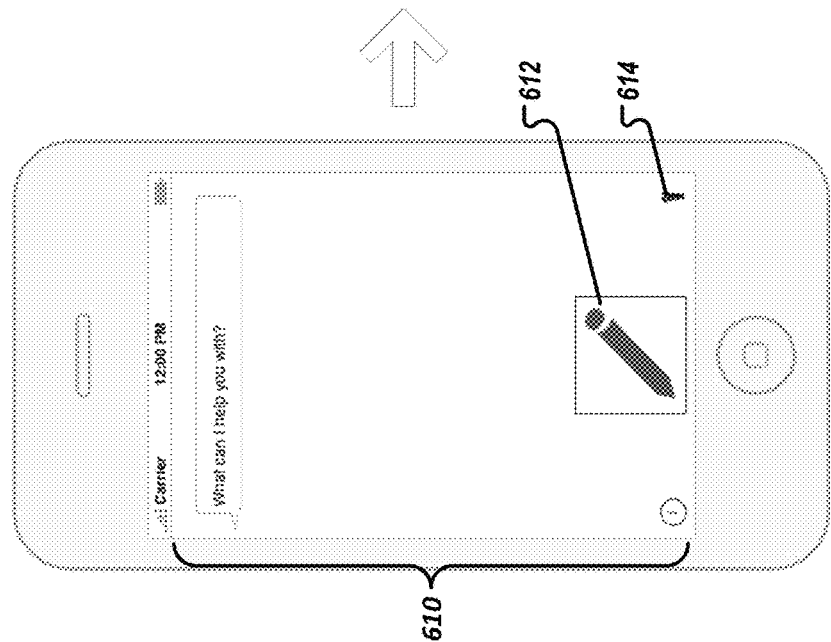

FIGS. 6A-6B are illustrations of an exemplary device 600 displaying screenshots of a GUI 610 of an electronic conversation assistant for performing a text-based interaction. The device 600 may be same as the client device 110 such that the GUI 610 may represent the GUI of the conversation assistant 112. The example below describes the device 600 as implemented in the communications system 100. However, the device 600 also may correspond to some device other than the device 110, or be implemented in other communications systems or system configurations.

The conversation assistant 112 enables a text-based interaction when it is in the write mode. As shown in FIG. 6A, in the write mode, the write button 612 is emphasized in the bottom center of the GUI 610 and the microphone button 614 is displayed in one corner. The user may switch from the write mode to the talk mode by selecting the microphone button 614, e.g., by touching a section of the display proximate to the write button 612 using a control object.

When the conversation assistant 112 is in the write mode, a keyboard 616 is displayed on the GUI 610, as shown in FIG. 6B. The user may input commands by typing text using the keyboard 610. The written commands are displayed in the text box 618. In one implementation, the conversation assistant 112 may use only text to communicate with the user. In such an implementation, the interactions of the conversation assistant 112 will not be converted into speech using text-to-speech.

In write mode, when the user clicks on the write button 612, the keyboard 616 is displayed on the GUI 610 for the user to type. In addition, the text box 618 shows what the user is typing. Conversation assistant 112 starts to process what the user typed when the user clicks on the 'Done' button 620 on the keyboard 616. When the user clicks on the 'Done' button 620, the keyboard 616 may disappear from view, and the write button 612 and the microphone button 614 may be displayed as shown in FIG. 6A. In one implementation, the conversation assistant 112 may play a distinct sound prompt indicating that the conversation assistant 112 is processing the user input. Alternatively, or in addition, the write button 612 may display a distinct animation to indicate that conversation assistant 112 is processing what the user has entered. In some implementations, when the conversation assistant 112 starts to process what the user entered, the user may be able to stop the processing by clicking on the write button 612.

FIGS. 7A-7B are illustrations of an exemplary device 700 displaying screenshots of a GUI 710 of an electronic conversation assistant for performing an interaction. The device 700 may be same as the client device 110 such that the GUI 710 may represent the GUI of the conversation assistant 112. The example below describes the device 700 as implemented in the communications system 100. However, the device 700 also may correspond to some device other than the device 110, or be implemented in other communications systems or system configurations.

The GUI 710 may be presented when the user of the device 700 attempts to use a voice bundle that does not exist.

As shown in FIG. 7A, when the user launches the conversation assistant 112, the home screen is displayed by the GUI 710, and the conversation assistant 112 says 'What can I help you with?' The user may say 'Twitter', as shown in the transcription 712 of the user's speech, to use a voice bundle associated with TWITTER™.

In one implementation, a voice bundle associated with TWITTER™ may not exist, either on the client device 700 or in the voice cloud 140. Based on the user command, the conversation assistant 112 checks whether a voice bundle associated with TWITTER™ is available in locally stored in the user device 700. The conversation assistant 112 determines that such a voice bundle is not locally available. In such an event, the conversation assistant 112 may access the voice cloud 140 and checks whether a voice bundle associated with TWITTER™ is available in the voice cloud 140. The conversation assistant 112 determines that such a voice bundle is also not available in the voice cloud 140. Consequently, the conversation assistant 112 may say an error message to the user. For example, the conversation assistant 112 may say, 'I cannot help you with Twitter at this time. Twitter integration will be available soon', as shown by the transcription 714 of the conversation assistant 112's words in FIG. 7B.

FIGS. 8A-8B are illustrations of an exemplary device 800 displaying screenshots of a GUI 810 of an electronic conversation assistant indicating error conditions. The device 800 may be same as the client device 110 such that the GUI 810 may represent the GUI of the conversation assistant 112. The example below describes the device 800 as implemented in the communications system 100. However, the device 800 also may correspond to some device other than the client device 110, or be implemented in other communications systems or system configurations.

FIG. 8A shows the GUI 810 that is displayed when the conversation assistant 112 cannot establish a network connection, e.g., through the network 130, to one or more of the CMS 120, the voice cloud 140, the ASR cloud 150, the TTS cloud 160 and the web services cloud 170. This may be the case, for example, when the conversation assistant 112 attempts to use the resources provided by one of the cloud servers to perform tasks based on a voice bundle that is currently under execution in the conversation assistant 112. In such cases, the conversation assistant 112 may say 'EVA not available. Connect to the Internet', as shown by the transcription 812. In this case, "EVA" may be a moniker for the conversation assistant 112.

In some implementations, when the conversation assistant cannot establish the network connection as described above, the conversation assistant 112 may cease execution of the voice bundle. In one implementation, the microphone button 814, the write button 816 and the information button 818 will be disabled—the disabled status of the buttons may be indicated by the buttons being grayed out on the GUI 810.

FIG. 8B shows the GUI 810 that is displayed when the conversation assistant 112 cannot access a resource needed to perform a task, even though a network connection may exist. For example, the conversation assistant 112 may attempt to use the ASR engine 152 to perform a speech recognition task. However, the conversation assistant 112 may get an error while trying to connect to the ASR engine 152.

In such an event, the conversation assistant 112 may say 'There is something wrong, and I can't answer your questions right now. Please try again in a little while', as shown by the transcription 820. Apart from providing the error indication as described above, the conversation assistant 112 may cease execution of the voice bundle. The microphone button 814, the write button 816 and the information button 818 may be disabled, which may be indicated by the buttons being grayed out on the GUI 810.

The disclosed and other examples can be implemented as one or more computer program products, that is, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, for example, magnetic, magneto optical disks, or optical disks. However, a computer need not have such devices. Computer readable media suitable for storing computer program instructions and data can include all forms of nonvolatile memory, media and memory devices, including by way of example semiconductor memory devices, for example, EPROM, EEPROM, and flash memory devices; magnetic disks, for example, internal hard disks or removable disks; magneto optical disks; and CD ROM and DVD- ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
providing, by a processor, a graphical user interface (GUI) on a display of an electronic device, the GUI visually presenting to a user a group of voice bundles that are available for use on the electronic device, each of the voice bundles including instructions executable within an environment provided by an application executed by the processor to perform a call flow that includes a sequence of prompt instructions and grammar instructions executable to result in a simulated multi-step spoken interaction between the electronic device and the user, each of the prompt instructions being executable to ask for information from the user and each of the grammar instructions being executable to interpret information entered through the electronic device by the user, wherein the application is configured to execute, within the environment provided by the application, a plurality of voice bundles that are independent of each other and that are downloaded onto the electronic device, the application being configured to automatically select one of the plurality of voice bundles to execute based on a user voice command by:
receiving the user voice command;
automatically disambiguating and identifying a topic associated with the user voice command; and
automatically selecting the one of the plurality of voice bundles to execute based on the automatically identified topic of the user voice command;
receiving, by the processor, an input from the user indicating a selection of a voice bundle from the group of voice bundles;
in response to the input, identifying, by the processor, a remote server that is configured to store the selected voice bundle;
establishing, by the processor, network communications between the electronic device and the remote server;
locating, by the processor, the selected voice bundle on the remote server; and
downloading, by the processor, a copy of the selected voice bundle from the remote server onto the electronic device,
wherein a voice bundle in the group of voice bundles is directed to enabling the user to perform a particular action through a multi-step spoken interaction between the user and the electronic device,
wherein the particular action is interacting with a social networking site audibly, and
wherein interacting with a social networking site audibly includes at least one of reading a newsfeed, informing the user regarding a number of friend requests that the user has, reading messages to the user, reading friend requests to the user and confirming friends of the user.

2. The method of claim 1, wherein the GUI visually presenting the group of voice bundles comprises the GUI displaying a group of icons corresponding to voice bundles in the group.

3. The method of claim 2, wherein receiving an input from the user comprises receiving an indication that the user has selected the icon corresponding to the selected voice bundle from the displayed group of icons.

4. The method of claim 1, wherein each voice bundle in the group of voice bundles is directed to enabling the user to perform a particular action through a multi-step spoken interaction between the user and the electronic device.

5. The method of claim 1, wherein the group of voice bundles includes a premium voice bundle that is configured to be used on the electronic device conditioned on receipt of payment of a fee.

6. The method of claim 5, wherein the fee is displayed along with a graphical representation of the premium voice bundle on the GUI.

7. The method of claim 1, wherein the group of voice bundles includes a free voice bundle that is configured to be used on the electronic device for free.

8. The method of claim 1,
wherein the group of voice bundles includes a private voice bundle that is configured to be accessed on the electronic device by the user conditioned on the user being authorized to receive the private voice bundle, and
wherein the user being authorized to receive the private voice bundle comprises the user entering a valid password or a valid special key through an interface corresponding to the application.

9. The method of claim 1, further comprising:
based on downloading a copy of the selected voice bundle, executing the selected voice bundle on the electronic device for performing a task in response to information entered by the user.

10. The method of claim 9, wherein comprises:
upon receiving the information entered by the user through the GUI, performing a call flow that simulates a multi-step interaction between the electronic device and the user and audibly or visually presents a result of executing the selected voice bundle.

11. The method of claim 10, wherein the selected voice bundle includes media used in the call flow and parameters used to guide the call flow and the media used, the media selected from the group consisting of voice, audio, video, graphics and text.

12. The method of claim 10, further comprising:
visually presenting, using the GUI, a transcription of the call flow.

13. The method of claim 1, wherein the selected voice bundle is implemented using State Chart Extensible Markup Language (SCXML).

14. The method of claim 1, wherein the application is configured to provide an interface between each of the voice bundles and a speech recognition resource, the speech recognition resource configured to recognize speech received from the user via the application.

15. The method of claim 1, wherein receiving the input from the user indicating the selection of a voice bundle from the group of voice bundles comprises:
receiving, by the processor, an input from the user that is one of a voice input entered through a microphone coupled to the processor or an input through the GUI.

16. The method of claim 1, wherein the plurality of voice bundles that are independent of each other include a first voice bundle configured to order a first product from a first vendor, and a second voice bundle configured to order a second product from a second vendor that is distinct from the first vendor.

17. A system comprising:
a processor; and
instructions encoded in a non-transitory machine-readable medium for execution by the processor, the instructions, when executed, configured to cause the processor to perform operations comprising:
providing a graphical user interface (GUI) on a display of an electronic device, the GUI visually presenting to a user a group of voice bundles that are available for use on the electronic device, each of the voice bundles including instructions executable within an environment provided by an application executed by the processor to perform a call flow that includes a sequence of prompt instructions and grammar instructions executable to result in a simulated multi-step spoken interaction between the electronic device and the user, each of the prompt instructions being executable to ask for information from the user and each of the grammar instructions being executable to interpret information entered through the electronic device by the user,
wherein the application is configured to execute, within the environment provided by the application, a plurality of voice bundles that are independent of each other and that are downloaded onto the electronic device, each of the voice bundles comprising instructions, the application being configured to automatically select one of the plurality of voice bundles to execute based on a user voice command by:
receiving the user voice command;
automatically disambiguating and identify a topic associated with the user command; and
automatically selecting the one of the plurality of voice bundles to execute based on the instructions of the voice bundles and the automatically identified topic of the user voice command;
receiving an input from the user indicating a selection of a voice bundle from the group of voice bundles;
in response to the input, identifying a remote server that is configured to store the selected voice bundle;
establishing network communications between the electronic device and the remote server;
locating the selected voice bundle on the remote server; and
downloading a copy of the selected voice bundle from the remote server onto the electronic device,
wherein each voice bundle in the group of voice bundles is directed to enabling the user to perform a particular action through a multi-step spoken interaction between the user and the electronic device,
wherein the particular action is one of ordering a product, requesting a service or interacting with a social networking site audibly, and
wherein interacting with a social networking site audibly includes at least one of reading a newsfeed, informing the user regarding a number of friend requests that the user has, reading messages to the user, reading friend requests to the user and confirming friends of the user.

18. The system of claim 17, wherein the GUI visually presenting the group of voice bundles comprises the GUI displaying a group of icons corresponding to voice bundles in the group.

19. The system of claim 18, wherein receiving an input from the user comprises receiving an indication that the user has selected the icon corresponding to the selected voice bundle from the displayed group of icons.

20. The system of claim 17, wherein the group of voice bundles includes a premium voice bundle that is configured to be used on the electronic device conditioned on receipt of payment of a fee.

21. The system of claim 20, wherein the fee is displayed along with a graphical representation of the premium voice bundle on the GUI.

22. The system of claim 17, wherein the group of voice bundles includes a free voice bundle that is configured to be used on the electronic device for free.

23. The system of claim 17, wherein the group of voice bundles includes a private voice bundle that is configured to be accessed on the electronic device upon the user entering a password or a special key through an interface corresponding to the application.

24. The system of claim 17, including instructions that are configured to cause the processor to perform operations comprising:
based on downloading a copy of the selected voice bundle, executing the selected voice bundle on the electronic device for performing a task in response to information entered by the user.

25. The system of claim 24, wherein the instructions that are configured to cause the processor to perform operations comprising executing the selected voice bundle includes instructions that are configured to cause the processor to perform operations comprising:
upon receiving the information entered by the user through the GUI, performing a call flow that simulates a multi-step interaction between the electronic device and the user and audibly or visually presents a result of executing the selected voice bundle.

26. The system of claim 25, wherein the selected voice bundle includes media used in the call flow and parameters used to guide the call flow and the media used, the media selected from the group consisting of voice, audio, video, graphics and text.

27. The system of claim 25, including instructions that are configured to cause the processor to perform operations comprising:
visually presenting, using the GUI, a transcription of the call flow.

28. The system of claim 17, wherein the selected voice bundle is implemented using State Chart Extensible Markup Language (SCXML).

29. The system of claim 17, wherein the application is configured to provide an interface between each of the voice bundles and a speech recognition resource, the speech recognition resource configured to recognize speech received from the user via the application.

30. The system of claim 17, wherein receiving the input from the user indicating the selection of a voice bundle from the group of voice bundles comprises:
  receiving an input from the user that is one of a voice input entered through a microphone coupled to the processor or an input through the GUI.

31. The system of claim 17, wherein the plurality of voice bundles that are independent of each other include a first voice bundle configured to order a first product from a first vendor, and a second voice bundle configured to order a second product from a second vendor that is distinct from the first vendor.

\* \* \* \* \*